May 31, 1960 — R. ROSENTHAL — 2,939,070
CONDUCTIVITY CELL
Filed Jan. 20, 1958

INVENTOR.
Robert Rosenthal
BY
Charles H. Brown
ATTORNEY

United States Patent Office

2,939,070
Patented May 31, 1960

2,939,070

CONDUCTIVITY CELL

Robert Rosenthal, Tenafly, N.J., assignor to Industrial Instruments, Inc., Cedar Grove, N.J.

Filed Jan. 20, 1958, Ser. No. 710,033

11 Claims. (Cl. 324—30)

This invention relates to conductivity cells and the electrodes thereof used for measuring the electrical conductivity of fluids where quantitative indications of the electrolyte concentration thereof may be had.

Difficulties have been experienced in using conventional conductivity cells in solutions heated to high temperatures (250–400° F.), particularly so when the pressures are elevated above 50 lbs. per inch gauge (>50 p.s.i.g.). In the conventional cells, the sealing areas are very small and the high temperature gaskets do not seal perfectly under conditions of high temperature and high pressure, even when used in uncorrosive solutions. As a result, there is some leakage past the gasket and this leakage causes a partial short-circuit of the electrodes and erroneous resistance readings.

The foregoing difficulties are overcome in the present invention by the use of specially designed electrodes each of which is essentially leak free and is provided with a chamber at the end adapted to be immersed in the solution. This chamber serves to isolate a column of relatively narrow cross-sectional area of the solution under test so that this column has a high resistance compared to the paths in the solution between the chambers in both electrodes. The electrodes are adapted to be physically spaced apart and immersed in a tank in which the liquid whose characteristics are being measured is contained.

Each electrode is in the form of an elongated cylinder of tough plastic material having a bore in the longitudinal axis thereof. A metallic conductor fits tightly within the bore and extends out from that end of the plastic cylinder which is adapted to protrude from the tank. The end of the electrode adapted to be immersed in the solution has a recess or open end constituting a chamber whose inside diameter is preferably wider than the bore. An electrically conducting disc is provided at the bottom of the chamber and this disc is connected to the nearest end of the conductor. To seal the external terminal of the electrode from the solution and to enable the electrode to be secured to the tank wall, there are provided: a sleeve-like compression fitting threaded at both ends and surrounding a portion of the plastic cylinder for threadedly engaging the tank wall, a sealing or packing gland having conical tapers at both ends, and a gland nut having its interior threaded for engaging with the threads at one end of the fitting. The inside of the nut at the base of the threading is beveled to compress the gland sleeve at one of its tapered ends. Because of the construction of the spaced electrodes, there cannot be any change in the measured resistance of the solution even if there were liquid leakage to the outside of the tank or container either through the packing gland or the bore since there is no path for electrical leakage between both electrodes of the cell.

By means of the improved electrode construction of the invention, there is provided a conductivity cell of high cell constant which is related to the geometry of the cell. By way of example only, the cell constant may have a value anywhere between 1 and 100 reciprocal centimeters depending upon the geometry of the chamber. Partial short-circuiting of the electrodes cannot occur even in the presence of moderate leakage. The electrical resistance between the two electrodes of the cell, when immersed in solution, is dependent almost exclusively on the characteristics of the solution and independent within practical limits of the relative positions of the electrodes to each other and to the walls of the solution containing tank or pipe. As an illustration, if the electrode has a cell constant of 1, the two electrodes of the cell can be displaced from each other by as much as 6 inches without altering the net cell constant of the pair by more than 1 percent. If the cell constant is higher, this displacement can be much higher.

A more detailed description of the invention follows in conjunction with drawings, wherein.

Throughout the figures of the drawing, the same parts are represented by the same reference characters, and equivalent parts are designated with prime markings.

Figure 1:
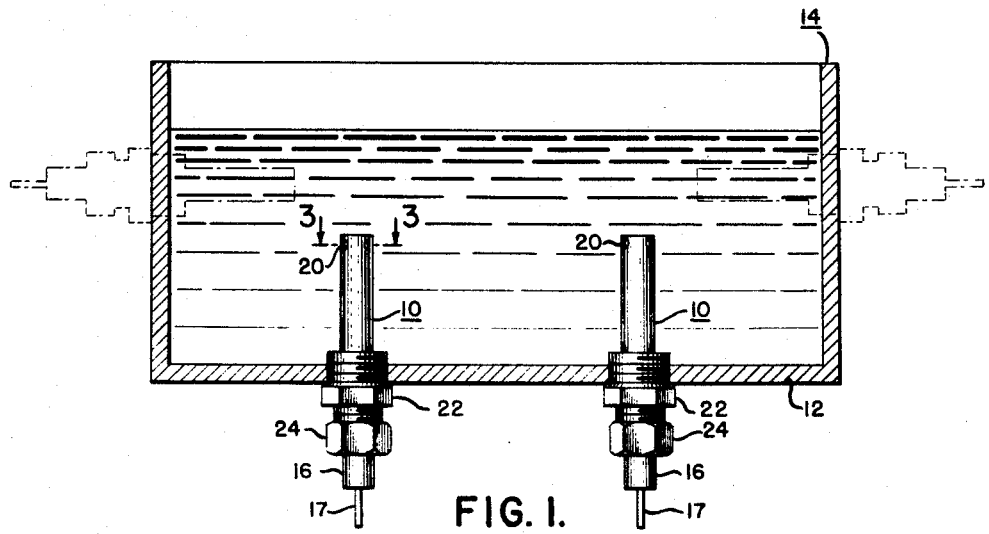
Fig. 1 is a more or less diagrammatic view of a tank or container having therein a solution or liquid the conductivity of which is to be measured, provided with the conductivity cell of the invention.

Referring to the drawing, Fig. 1 shows two similarly constructed electrodes 10, 10 of the invention threadedly fastened to a wall 12 of a tank 14 containing a fluid or solution the conductivity of which is to be measured. By way of example only, the solution may contain a salt, or a detergent, or form part of a digester system in the processing of paper mill pulp. In some of these applications, the pressure of the solution may be of the order of fifty to several thousand pounds at high temperatures in the range of 250 to 400° F. In certain cases, the pressure may be removed and replaced by a vacuum.

Since both electrodes 10, 10 are similar in construction, only one will be described in detail. The electrode includes a cylinder 16 of tough plastic electrical insulator material, such as polytetrafluoroethylene or polychlorotrifluoroethylene known respectively in the trade by the names "Teflon" and "Kel–F," which has a bore along the longitudinal axis thereof. Within this bore in a tight fit, or by cementing, is a metallic conductor 17 which has a portion extending from one end of the cylinder 16 to form an electrical terminal outside the tank 14. A recess or chamber 18 is provided at the other end of the cylinder 16 which is adapted to be immersed in the solution. This chamber, when immersed in the solution, provides a column of liquid of relatively narrow cross-sectional area which is high in electrical resistance as compared to the paths through the solution between the chambers of both electrodes. The inside diameter of the bore in the plastic cylinder 16 is smaller than the diameter of the recess or chamber 18.

A plurality of side holes or air vents 20, shown as three in number, permit air bubbles in the column of the solution within the recess or chamber 18 to pass out into the tank.

Terminating the electrical conductor 17 at the end nearest the chamber 18 and soldered thereto is an electrically conducting plate or sheet or disc 21 of any suitable configuration, such as round or otherwise, made from metal, graphite or carbon. Disc 21 is positioned at the bottom of the chamber and contacts the liquid within the chamber.

To fasten the electrode to one wall of the tank or container 14, there is provided a sleeve-like compression fitting 22 having a body threaded at both ends. This fitting surrounds a portion of the insulating cylinder 16, and has one threaded end threadedly engaging the threads of an opening in the tank wall 12, as shown clearly in Fig. 2. This threaded area enables the electrode to be screwed into the tank wall or the pipe in which flows the solution to be measured. A packing or gland sleeve 23 made from thin deformable metal surrounds a small portion of the cylinder 16. This gland sleeve is conically tapered at both ends as shown. A gland nut 24 is provided with a threaded interior for engaging the other end of the compression fitting 22, to thereby force pressure upon both tapered ends of the gland and form a liquid-tight seal. It should be noted that the inside diameter of the gland nut is wider than the widest diameter of the gland sleeve and that the inside of the nut at the base of the threading thereof is beveled for compressing the adjoining tapered end of the gland sleeve. The end of the compression fitting 22 nearest the gland sleeve 23 is slightly beveled in the interior thereof to permit the adjoining tapered end of the gland sleeve to enter it and be compressed when the nut is tightened.

Any known type of indicating circuit such as electrical apparatus containing a Wheatstone bridge may be connected to the external terminal ends of metallic conductors 17 of the two electrodes of the cell of the invention.

If desired, the electrodes of the invention may take any desired position on the tank; for example, the positions indicated in dotted lines in Fig. 1.

In securing the electrode 10 to the tank 14, the compression fitting is first screwed into the threaded opening in the tank and then the gland nut 24 tightened on the fitting so as to compress the gland sleeve 23. The assembly of parts is such that there is provided a liquid seal between the tank and solution therein and the external terminal of the electrode. Even in the presence of any leakage through the bore, or past the gland sleeve, there is no possibility of partially short-circuiting the electrodes of the conductivity cell. The result is that the electrical resistance between the electrodes, immersed in the solution, is dependent exclusively on the characteristics of the solution and is almost independent of the relative positions of the electrodes to each other and to the walls of the tank.

Figures 2, 3, 4, 5, 6:
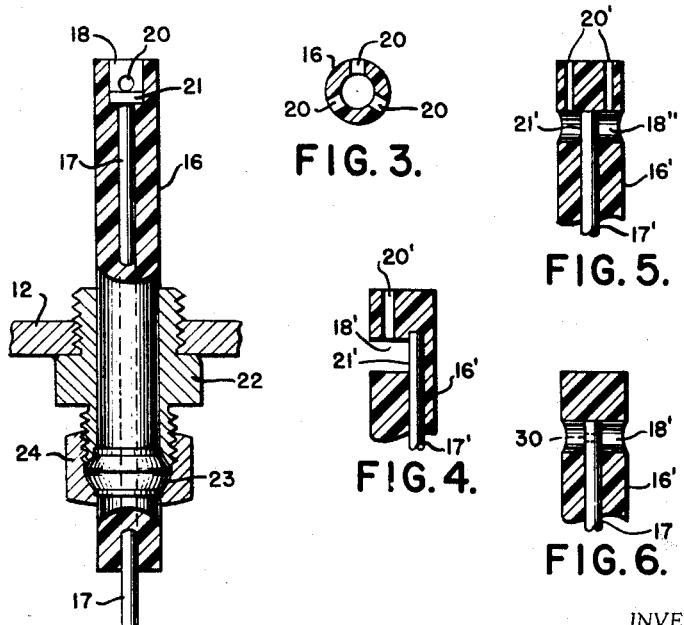
Fig. 2 is a view, partly in section, of an electrode of the cell of the invention, showing the constructional details which enable it to be secured in fluid-tight relationship to a wall of the tank.
Fig. 3 is a transverse cross-section through the recess or chamber at one end of the electrode along a line 3—3 passing through the air vents.
Figs. 4, 5 and 6 are modifications of the electrode of Fig. 2, differing from Fig. 2 mainly in the location of the recess or chamber.

Figs. 4, 5 and 6 are modifications of the electrode of the invention and differ mainly from the electrode shown in Fig. 2 in the location of the chamber or recess. In Figs. 4, 5 and 6 the recess is located intermediate the ends of the elongated insulator. Since the sealing glands or mountings for all of the electrodes may be the same, only those portions of the electrode which are different from that of Fig. 2 are shown in Figs. 4, 5 and 6 in the interest of simplicity of illustration.

In Fig. 4 the recess or chamber 18' enters the side wall of the insulator 16' at a distance from the top of the insulator. The conductor 17' fits tightly into the bore drilled along the length of the insulator, and extends into the chamber 18' at the base or bottom thereof. It should be noted that the extreme end of the metallic conductor extends beyond the chamber. The purpose of this extension is to firmly anchor or embed the end of the conductor into the insulator. The conductor 17' is shown positioned slightly to one side of the longitudinal axis of the insulator, although the electrode structure can be so designed, if desired, that the bore and conductor therein extend along the axis of the insulator.

An air vent 20' is shown extending from the top end of the insulator to the chamber with which it communicates.

Fig. 5 shows an electrode structure wherein the chamber 18" extends completely through the side wall of the insulator 16'. Within the chamber 18" is an electrically conducting plate or disc 21' which is connected or soldered to the end of conductor 17 to make electrical connection thereto. Since the disc 21' divides the chamber 18" into two separate non-communicating parts, then there are provided two air vents 20', as shown.

Fig. 6 differs from the electrode of Fig. 5 mainly in the provision of a hole 30, shown in dotted lines, through the plate or disc within the chamber, thus eliminating the need for air vents extending through the insulator walls. If the disc within the chamber is merely a continuation of conductor 17 and has a diameter smaller than the width of the chamber, then it is unnecessary to provide a hole 30.

It should be understood that the diameter of the recess or chamber need not be wider than the bore accommodating the metallic conductor. The cross-section and length of the chamber determine the value of the cell constant.

The use of electrodes of high cell constant in accordance with the invention enables the utilization of measuring instruments, such as for example A.C. Wheatstone bridges, at a higher level of accuracy in conductive fluids than would be possible with electrodes of low cell constant.

What is claimed is:

1. An electrode assembly for a conductivity cell comprising an elongated insulator having a bore along the length thereof, an electrical conductor fitting tightly within and in close contact with the wall of said bore and terminating within said insulator and short of one end of said insulator, said insulator having near said one end a recess or opening in the wall which extends from the outer surface thereof, to thereby constitute a chamber for a small portion of the length of the insulator, an electrically conducting element within said chamber and connected to said conductor, and a pressure-tight fitting surrounding said insulator and having means for mounting said electrode assembly on and within a liquid-tight container adapted to receive and hold a liquid, said conductor constituting an electrode which is effectively completely internal to the surrounding insulator and the sole conductor emerging from the other end of said insulator.

2. An electrode assembly as defined in claim 1 including a plurality of vent holes in the side wall of said chamber, said fitting having the interior thereof beveled at that end which contacts said gland sleeve, whereby the other tapered end of said gland sleeve is compressed by said fitting upon the tightening of said nut.

3. An electrode as defined in claim 1, wherein said insualtor is polytetrafluoroethylene.

4. An electrode assembly in accordance with claim 1, wherein said insulator is provided with an air vent passing through the wall thereof and communicating with said chamber.

5. An electrode assembly as defined in claim 4, characterized in that the chamber is located intermediate the ends of said insulator and enters only part way into the wall of said insulator, said chamber having a width which is appreciably smaller than the thickness of said insulator.

6. An electrode assembly as defined in claim 4, characterized in that the chamber is located intermediate the ends of said insulator and passes completely through the insulator.

7. An electrode assembly for a conductivity cell comprising an elongated cylindrical insulator having a bore along the longitudinal axis thereof, one end of said insulator having a recess or open end communicating with the outer surface of the insulator and constituting a chamber for a small portion of its length, the inside diameter of said chamber being wider than that of said bore, an electrically conducting disc at the bottom of said chamber, a metallic conductor fitting tightly within and in close contact with the wall of said bore and terminating within said insulator at said disc but extending outwards from the other end of said insulator, said conductor being connected to said disc, whereby said conductor constitutes an electrode which is effectively completely internal to its surrounding insulator, a sleeve-like compression fitting surrounding a portion of said insulator and having a body threaded at both ends, a sealing or packing gland sleeve surrounding a small portion of said insulator and having conical tapers at both ends thereof, a gland nut having its interior threaded for engaging with the threads at one end of said fitting, said sealing gland sleeve being positioned between and adapted to contact said fitting and said nut and having a diameter across its widest part which is smaller than the inside diameter of said nut, said nut having the inside thereof beveled at the base of the threading thereof for compressing the gland sleeve at one of its tapered ends, whereby a liquid seal is formed between said gland seal and nut.

8. A conductivity cell comprising two entirely separate but similarly constructed and physically spaced apart electrode assemblies the resistance between which, when immersed in and separated by a fluid, is substantially independent of the relative positions of the electrode assemblies to each other and depends almost exclusively on the characteristics of the fluid, each electrode assembly including an elongated insulator having a bore substantially along the longitudinal axis thereof, an electrical conductor fitting tightly within and in close contact with the wall of said bore and terminating within said insulator short of one end of said insulator, said insulator having near said one end a recess or opening in the wall extending from the outer surface thereof to thereby constitute a chamber for a small portion of its length, an electrically conducting element within said chamber and connected to said conductor, and a pressure-tight fitting surrounding said insulator and having means for mounting said electrode on one or more walls of a liquid-tight container adapted to receive and hold said fluid, said conductor constituting the sole conductor emerging from the other end of said insulator; the spacing of said mounting means for said electrode assemblies as mounted on said container determining the spacing between said assemblies.

9. An electrode assembly for a conductivity cell comprising an elongated insulator having a bore along the length thereof, said insulator having a hole passing through the side wall thereof at a location near to but removed from one end of the insulator for enabling a fluid to enter therein, an electrical conductor fitting tightly within and in close contact with the wall of said bore and passing through said hole, said electrical conductor terminating within said insulator, said insulator having insulation above and between said one end and the nearest end of said conductor, and a pressure-tight fitting surrounding said insulator and having means for mounting said electrode assembly on and within a liquid-tight container adapted to receive and hold a liquid, said conductor constituting the sole conductor emerging from the other end of said insulator, whereby said conductor constitutes an electrode which is effectively completely internal to the insulator.

10. A conductivity cell comprising two entirely separate and physically spaced apart electrode assemblies the resistance between which, when immersed in and separated by a fluid within a liquid-tight container, is substantially independent of the relative positions of the electrode assemblies to each other and to the walls of the container and depends almost exclusively on the characteristics of the fluid; each electrode assembly including an elongated insulator having a bore along the longitudinal axis thereof, one end of said insulator having a recess or open end communicating with the outer surface of the insulator and constituting a chamber for a small portion of its length, the inside diameter of said chamber being wider than that of said bore but narrower than the thickness of said insulator, an electrically conducting disc at the bottom of said chamber, a metallic conductor fitting tightly within and in close contact with the wall of said bore and terminating within said insulator at said disc but extending outwards from the other end of said insulator, said conductor being connected to said disc whereby said conductor constitutes an electrode which is effectively completely internal to its surrounding insulator, a sleeve-like compression fitting surrounding a portion of said insulator and having a body threaded at both ends, a sealing or packing gland sleeve surrounding a small portion of said insulator and having conical tapers at both ends thereof, a gland nut having its interior threaded for engaging with the threads at one end of said fitting, the other end of said fitting threadedly engaging a wall of said container, said sealing gland sleeve being positioned between and adapted to contact said fitting and said nut and having a diameter across its widest part which is smaller than the inside diameter of said nut, said nut having the inside thereof beveled at the base of the threading thereof for compressing the gland sleeve at one of its tapered ends, whereby a liquid seal is formed between said gland seal and nut; the spacing between said fittings of said electrode assemblies on said container determining the spacing between said electrodes.

11. A conductivity cell comprising two entirely separate but similarly constructed and physically spaced apart electrodes the resistance between which, when immersed in and separated by a fluid within a fluid-tight container, is substantially independent of the relative positions of the electrodes to each other and to the walls of the container and depends almost exclusively on the characteristics of the fluid; each electrode assembly including an elongated insulator having a bore along the longitudinal axis thereof, a metallic conductor fitting tightly within said bore and extending outwards from only one end of said insulator, the other end of said insulator having a recess or open end extending from the outer surface of the insulator to thereby constitute a chamber for a small portion of its length, the width of said chamber being less than the thickness of said insulator one end of said metallic conductor being electrically coupled to the interior of said chamber and terminating within said insulator at a distance removed from said other end of said insulator, whereby said conductor constitutes an electrode which is effectively completely internal to the insulator, and means individual to each electrode assembly and surrounding a portion of said insulator for mounting the electrode assembly on one or more walls of said container in fluid-tight relation thereto with the chamber of the electrode assembly in the interior of the container and the outwardly extending portion of the metallic conductor external of the container, the spacing of said mounting means on said container walls determining the spacing between said electrodes.

References Cited in the file of this patent

UNITED STATES PATENTS

| | | |
|---|---|---|
| 1,592,979 | Keeler | July 20, 1926 |
| 2,525,754 | Albrecht | Oct. 17, 1950 |
| 2,611,007 | Cade et al. | Sept. 16, 1952 |
| 2,709,781 | Douty et al. | May 31, 1955 |